Aug. 26, 1958  N. C. THOMSEN  2,848,913
SELF CENTERING MULTIPLE BORING TOOL HOLDER
Filed March 5, 1956
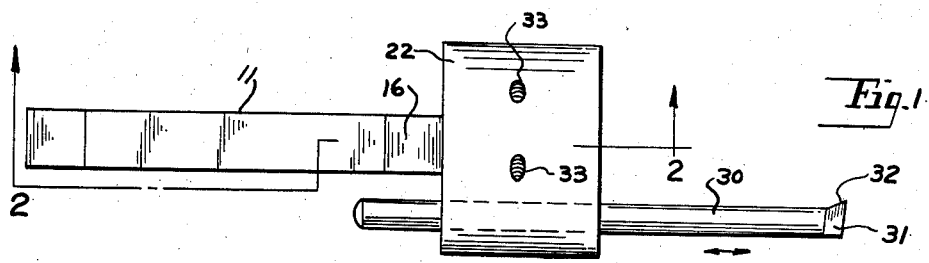
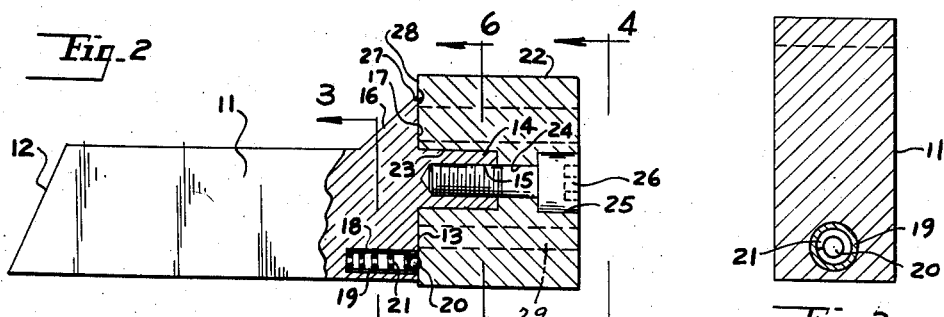
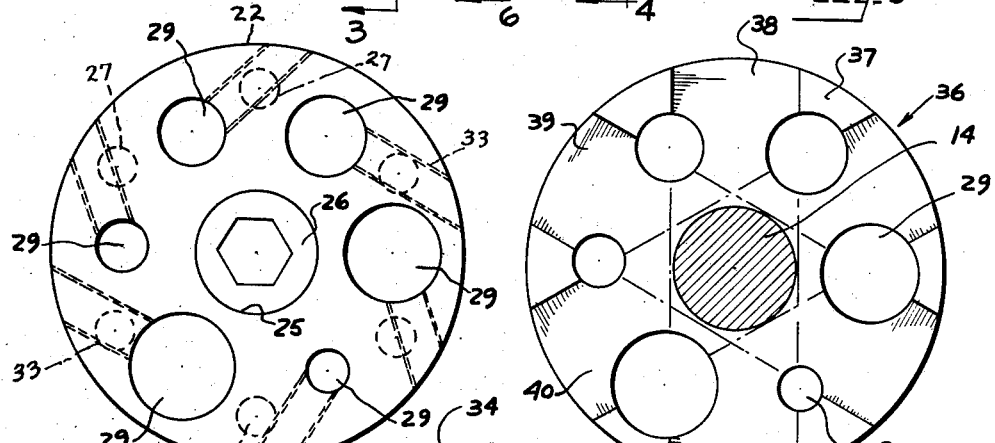
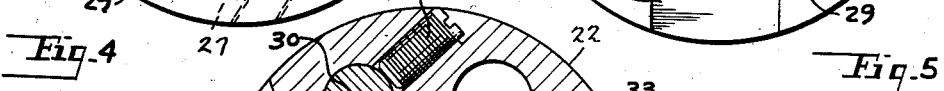
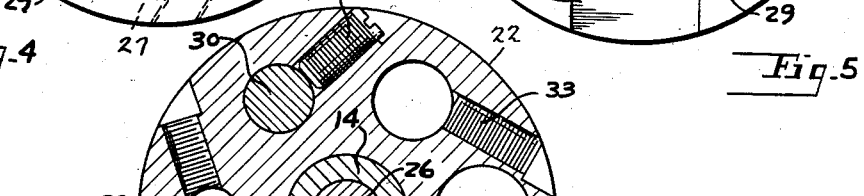
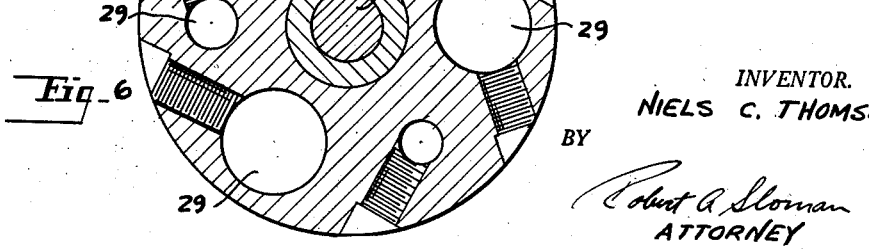
INVENTOR.
NIELS C. THOMSEN
BY
Robert A. Sloman
ATTORNEY

United States Patent Office 2,848,913
Patented Aug. 26, 1958

2,848,913

SELF CENTERING MULTIPLE BORING TOOL HOLDER

Niels C. Thomsen, Ferndale, Mich.

Application March 5, 1956, Serial No. 569,373

2 Claims. (Cl. 77—58)

This invention relates to a self-centering boring tool holder for a lathe.

It is the object of the present invention to provide a novel construction of boring tool holder which includes a rotatable barrel having a series of longitudinal apertures of different diameter adapted to selectively receive adjustably any one of a plurality of different diameter boring tools.

It is the further object of the present invention to provide a novel boring tool holder which includes a shank and a barrel journaled on the shank axially thereof and with the said barrel having formed therethrough a series of parallel boring tool receiving apertures, all at equal distances from the center of rotation of the barrel, whereby once the tool holder has been set up for a particular boring tool, the same set-up may be used upon the interchange of a different diameter boring tool.

These and other objects will be seen from the following specification and claims in conjunction with the appended drawing, in which:

Fig. 1 is a plan view of the present boring tool holder.

Fig. 2 is a section taken on line 2—2 of Fig. 1.

Fig. 3 is a section on increased scale taken on line 3—3 of Fig. 2.

Fig. 4 is a section on increased scale taken on line 4—4 of Fig. 2.

Fig. 5 is a section on an increased scale, but showing a different end face for the rotatable holder.

Fig. 6 is a similar section taken on line 6—6 of Fig. 2.

It will be understood that the above drawing illustrates merely a preferred embodiment of the invention and that other embodiments are contemplated within the scope of the claims hereafter set forth.

The present boring tool holder is particularly adaptable for use in conjunction with a lathe having a predetermined axis of rotation, said lathe also including a conventional tool post, normally mounted upon the cross slide.

The construction of the lathe is conventional in all respects, and further reference to the detail thereof is omitted.

The present boring tool holder includes a horizontally extending upright shank 11, preferably of rectangular cross-section which is adapted to be positioned within the said tool post and extending in a direction parallel to the axis of rotation of the lathe.

Said shank at its forward end has a right angularly related end face 13, the opposite end of said shank being tapered as at 12.

Cylindrical boss 14 forms a part of shank 11 and projects normally of and forwardly of end face 13, as shown in Fig. 2. Said boss has a central bore and is interiorly threaded as at 15.

Adjacent the forward end of shank 11 and upon the upper longitudinal edge thereof, there is provided an upwardly and outwardly tapered transverse boss 16, which extends throughout the width of shank 11 and likewise terminates in the upright end face 17 which is coplanar with shank end face 13 for cooperation therewith.

A suitable ball detent is mounted within the end portion of the lower portion of the shank and extends axially thereof. Said ball detent in the present embodiment includes a cylindrical sleeve 19 which is snugly nested within bore 18 extending to end face 13. Ball 20 is mounted within the casing 19 and by the outer formation thereof is limited in its outward movement to the position shown in Fig. 2. Coiled spring 21 is positioned within the detent casing and at one end bears against the shank, the opposite end normally biasing ball 20 outwardly, to complete the detent construction.

Cylindrical barrel 22 has a central aperture 23 which extends inwardly from one end face of said barrel and cooperatively receives boss 14 to thereby provide a journal or support for the said barrel for rotary adjustment upon said shank.

Aperture 23 at its inner end terminates in the central opening 24 of reduced diameter, and this latter opening within the said barrel terminates in the enlarged countersunk opening 25 which extends to the outer end wall of said barrel.

A suitable locking bolt or screw having an enlarged socket type head is centrally projected through the barrel with its shank extending through opening 24 and in threaded engagement upon the interior of the boss 14. After rotary adjustment of barrel 22 to the desired position, the screw 26 is tightened for immovably securing said barrel upon the said boss and with respect to the end faces 13 and 17 of the shank.

A series of circular depressions 27 are formed in spaced relation within the end wall 28 of said barrel, all at the same radial distance from the center of rotation. Said depressions are adapted for registry selectively with the said ball detent 20 in the shank which thereby limits the rotary positioning of the barrel, when the screw 26 has been temporarily loosened for this purpose.

A series of parallel spaced boring tool receiving slots 29 of different diameter are formed lengthwise through the barrel and are arranged at equal distances from the center of rotation. For illustration, the diameters of the said slots may be within the range 3/16–1/4, 5/16–3/8, 7/16–1/2 inch. Accordingly, boring tools of corresponding external diameters are adapted for alternate or selective positioning through one of the said slots 29.

Said boring tools consist of elongated cylindrical shank 30 shown in Fig. 1 which terminates in the cutting head 31 at one end and the tapered cutting edge 32. In the manner hereafter described, the said shank 30 may be adjusted longitudinally, as well as rotatively, with respect to the barrel and secured in such adjusted position.

For this purpose there are formed within the barrel transversely thereof at the central portion a series of interiorly threaded apertures 33 which communicate at their inner ends with a corresponding slot 29. These respective apertures 33 have threaded therein set screws 34 whose inner ends are adapted to operatively and frictionally engage and retain the boring tool shank 30 in its adjusted position.

In setting up the tool holder for a particular job, the desired boring tool is properly inserted within one of the slots 29 and is longitudinally adjusted with respect thereto and rotatively adjusted within the said slot so that the cutting edge 32 will be in the correct working relation with respect to the workpiece. For illustration, the end portion of the cutting edge will be aligned with the axis of rotation of the workpiece carried by the head stock of the lathe, after which the particular set screw 34 will be tightened.

Once this set-up has been accomplished, it will not be necessary to reset the shank of the boring tool holder or effect any other adjustment when it is desired to replace one boring tool by another of larger or smaller diameter.

Accordingly, there is provided a self-centering boring tool holder for a lathe and including a rotatively adjustable barrel adapted to selectively support one of a plurality of different diameter boring tools.

In Fig. 5 a different end face 37 is provided for the cylinder or barrel 36.

The construction in all other respects is the same as the barrel 22 of Fig. 2 and includes similar parallel boring tool receiving openings or slots 29.

The said end face, in the place of the series of ball detent depressions 27, has formed therein at a uniform depth a series of transverse acute angularly related intersecting depressions 38, 39 and 40.

Each of these depressions or slots are of a width adapted to cooperatively, snugly and retainingly receive the end face 13–17 of shank 11 for effectively securing said barrel with respect to the shank when the screw 26 has been tightened.

Each of the said depressions 38, 39 and 40 are arranged at a predetermined relation with respect to adjacent boring tool receiving openings 29. Though the portions of the said slots 38, 39 and 40 will not show where they intersect, for convenience of illustration, the drawing indicates the extensions of said slots by the dotted lines in Fig. 5.

Having described my invention, reference should now be had to the claims which follow.

I claim:

1. A self-centering boring toolholder for a lathe comprising a horizontally extending shank of rectangular cross section and including a flat upright end face, a cylindrical interiorly threaded boss forming an integral part of said shank and projecting normally of said end face, a centrally apertured barrel with one end wall bearing against said end face rotatably journaled on said boss and adjustably secured thereto, there being a series of parallel spaced boring tool receiving slots of different diameter formed lengthwise through said barrel at equal distances from its center of rotation, means on said barrel registerable with each of said slots to retainingly engage a boring tool of predetermined diameter adjustably secured longitudinally and rotatively within one of said slots, the aperture in said barrel at its inner end terminating in an axial opening of reduced diameter adapted to receive the shank of a securing screw, said reduced opening terminating in a counter-sunk opening extending to the outer wall of the barrel, a headed screw extending through said barrel for securing the same in rotatively adjusted position, there being a series of transverse acute angularly related intersecting depressions of uniform depth formed in said one end wall of the barrel, each depression being at a predetermined definite spaced relation to corresponding tool receiving slots, and of a width to cooperatively and retainingly receive therein the end face of said shank.

2. The boring toolholder of claim 1, said boss being adjacent the upper longitudinal edge of the shank, and an upwardly and outwardly tapered boss at the end of said shank extending above said boss and including an end face coplanar with the shank end face slidably and supportably registerable with said one end wall of the barrel, said depressions retainingly receiving therein respectively the end face of said angular boss.

References Cited in the file of this patent

UNITED STATES PATENTS

| | | |
|---|---|---|
| 707,472 | Welter | Aug. 19, 1902 |
| 740,107 | Dworzek | Sept. 29, 1903 |
| 790,479 | Carr | May 23, 1905 |
| 1,582,077 | Palmer | Apr. 27, 1926 |
| 2,337,663 | Jones | Dec. 28, 1943 |
| 2,368,736 | Wyrick | Feb. 6, 1945 |
| 2,478,026 | Thorell | Aug. 2, 1949 |
| 2,504,595 | Scism | Apr. 18, 1950 |
| 2,711,664 | Misuraca | June 28, 1955 |
| 2,783,664 | Johnson | Mar. 5, 1957 |

FOREIGN PATENTS

| | | |
|---|---|---|
| 413,628 | Germany | May 25, 1925 |